Figure 199:
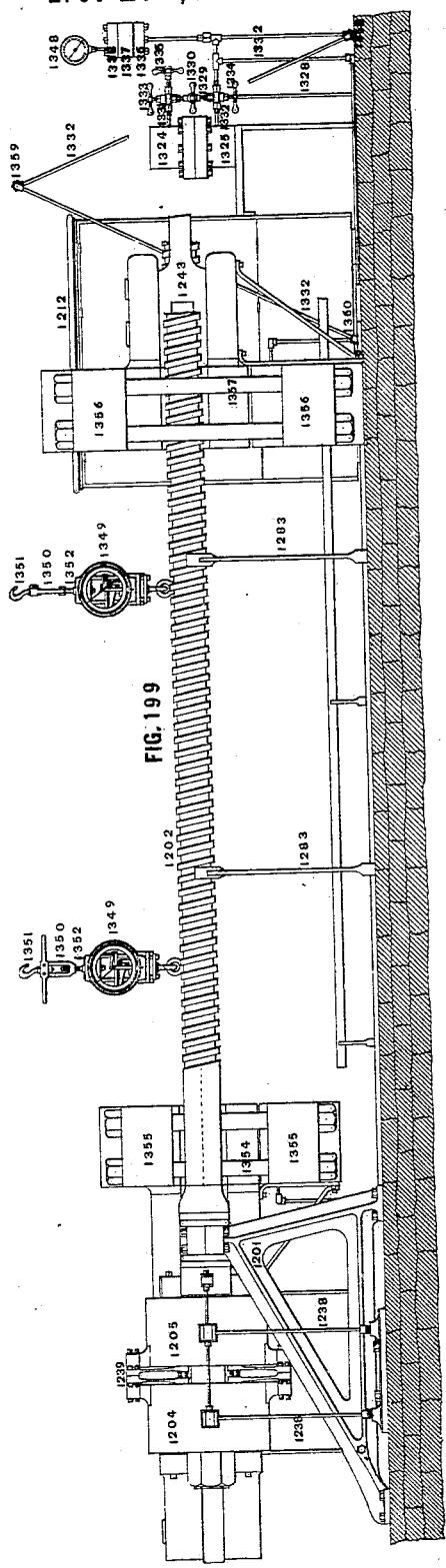

(No Model.) 4 Sheets—Sheet 1.
A. H. EMERY.
MACHINE FOR TESTING THE STRENGTH OF MATERIALS.
No. 278,916. Patented June 5, 1883.
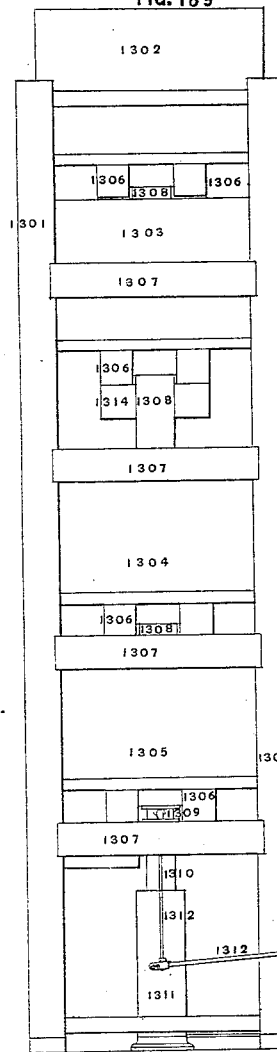
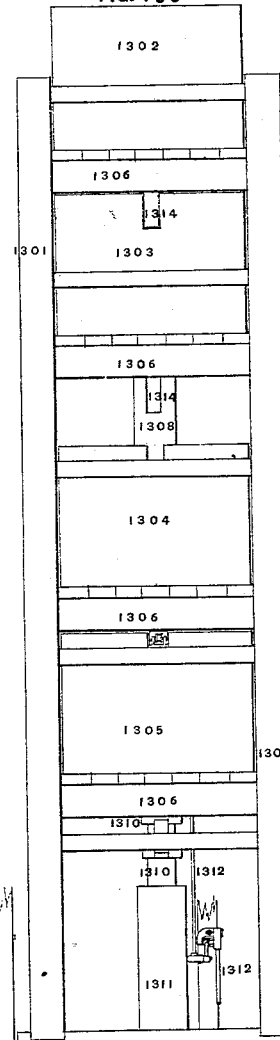
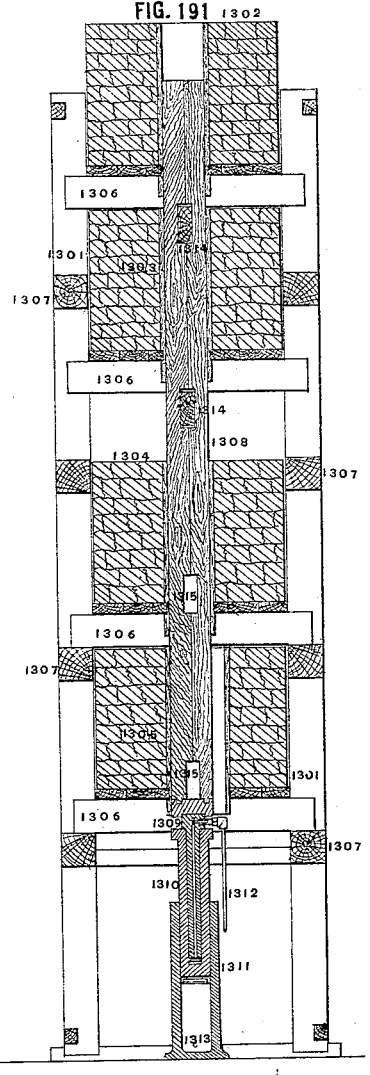
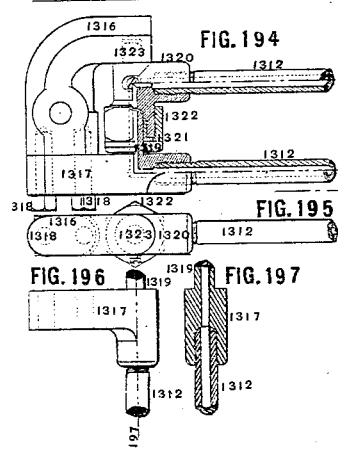
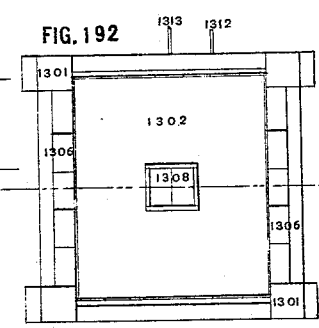
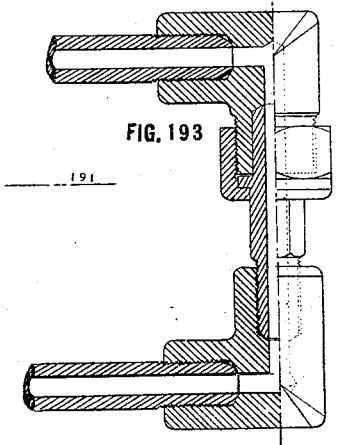
WITNESSES. Walter Allen, Harry E. Knight
INVENTOR Albert H. Emery by Knight Bros Attys (No Model.) 4 Sheets—Sheet 2.
A. H. EMERY.
MACHINE FOR TESTING THE STRENGTH OF MATERIALS.
No. 278,916. Patented June 5, 1883.
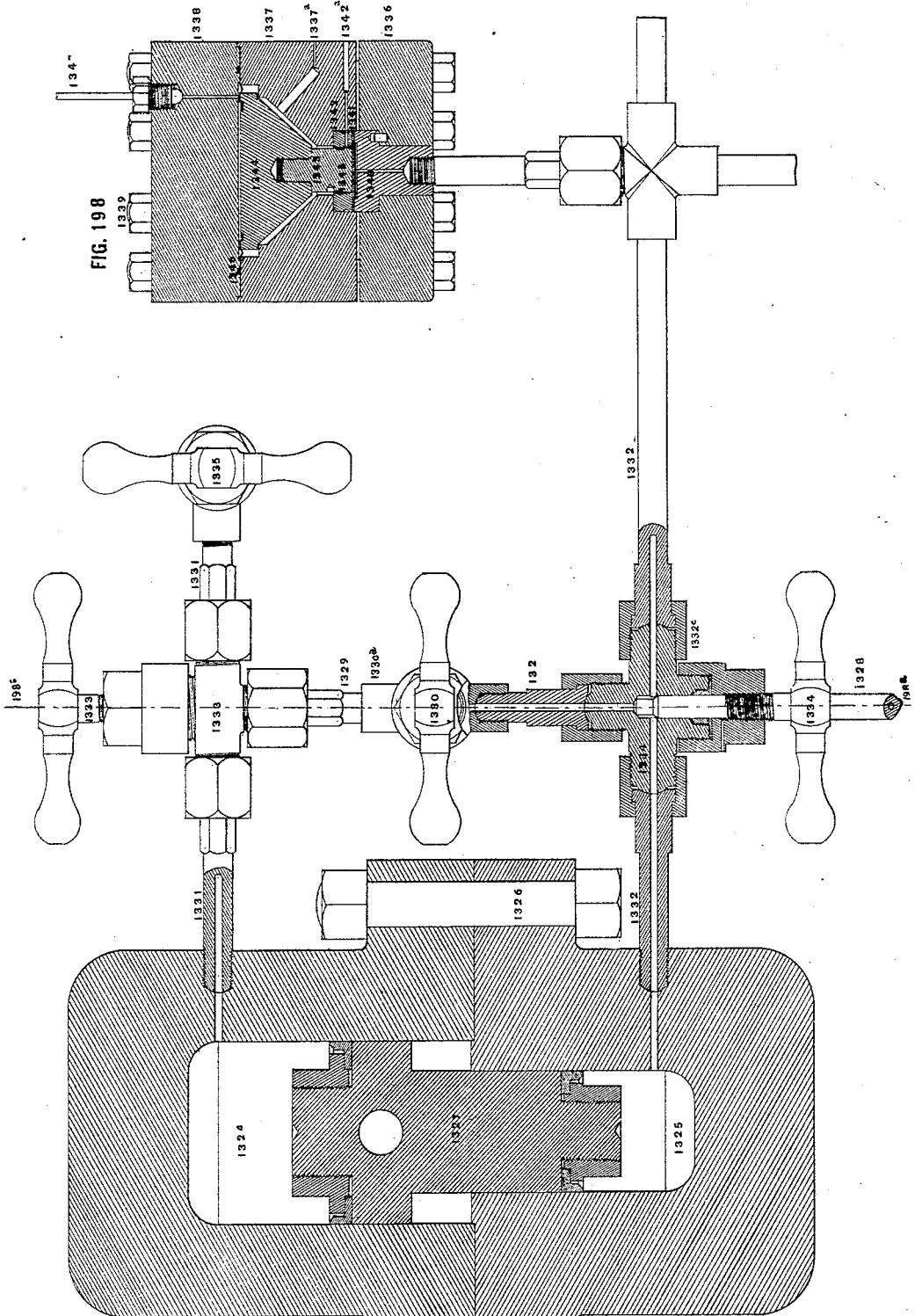
WITNESSES. Walter Allen, Harry E. Knight
INVENTOR— Albert H. Emery
BY Knight Bros. attys (No Model.) 4 Sheets—Sheet 3.
A. H. EMERY.
MACHINE FOR TESTING THE STRENGTH OF MATERIALS.
No. 278,916. Patented June 5, 1883.
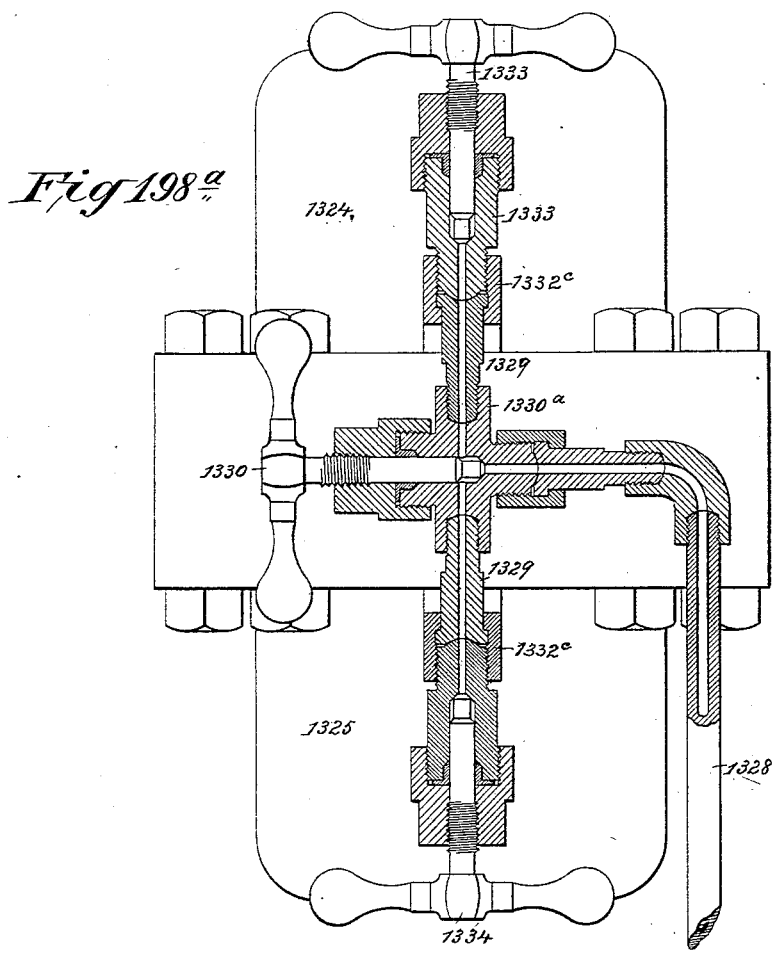
Fig 198.ᵃ
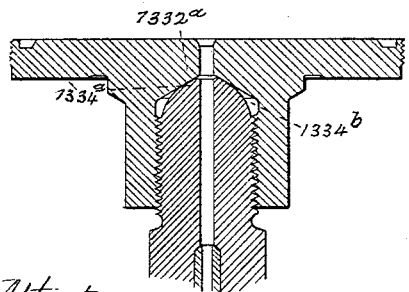
Fig 198.ᶜ
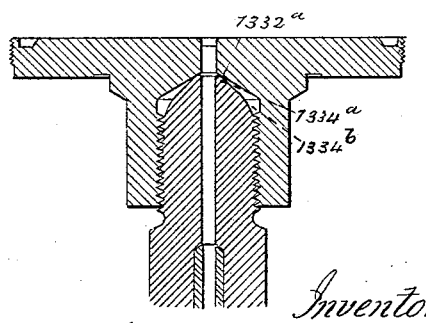
Fig 198.ᵇ
Attest:
Geo. T. Smallwood Jr.
Harry E. Knight
Inventor:
Albert H. Emery.
By Knight Bros.
attys (No Model.) 4 Sheets—Sheet 4.

A. H. EMERY.
MACHINE FOR TESTING THE STRENGTH OF MATERIALS.

No. 278,916. Patented June 5, 1883.

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

MACHINE FOR TESTING THE STRENGTH OF MATERIALS.

SPECIFICATION forming part of Letters Patent No. 278,916, dated June 5, 1883.

Application filed February 5, 1881. (No model.)

*To all whom it may concern:*

Be it known that I, ALBERT H. EMERY, of the city, county, and State of New York, have invented certain new and useful Improvements in Machines for Testing the Strength of Materials, and in power accumulators and multipliers and pressure-pipe connections for hydraulic machinery employed in connection therewith, of which the following is a specification.

This invention relates to a power-accumulator by which power developed through a forcing-pump or other prime mover may be stored for any necessary length of time and applied at the will of the operator. The device possesses the further advantage of applying pressure uniformly without pulsation. The accumulator consists of a series of weights, one or any required number of the weights to store the desired amount of power. The press by which the weights are raised and through which their power is subsequently used is constructed with two or more concentric cylinders. The inner cylinder constitutes the ram of the outer cylinder, and is so used when low power is required. For higher power an inner ram is used within the inner cylinder. The pressure is communicated from the accumulator to the holding or straining press of a testing-machine through pipes constructed with peculiar joints consisting of clamps and nuts with packed nipples to permit the articulation of the pipes and prevent the escape of liquid under heavy pressure. To develop increased pressure when required, a multiplier is introduced, consisting of two coupled cylinders of different areas with connected pistons, the piston of larger area receiving liquid from the accumulator and forcing liquid out of the smaller cylinder with increased pressure. These coupled cylinders are connected with a system of pipes and valves enabling the direct application of the pressure from the accumulator to the presses, or causing it to be communicated through the multiplier at the will of the operator. For the purpose of indicating the pressure in the pipes and presses, a suitable gage is connected with a liquid-pressure reducer, consisting of two pressure-chambers of unequal areas connected by a pressure-column receiving pressure on its smaller end from the small chamber and developing reduced pressure on the liquid in the larger chamber from its larger end, the smaller end being inclosed in a packing and centering-ring and resting on the flexible diaphragm of small pressure-chamber, which connects, either with or without an intervening reducer, with the liquid the pressure of which is to be measured. For use in connection with pressure-pipes, and for other purposes, I have devised a novel mode of connecting or coupling pipes, which consists, essentially, in forming one member of the pipe with a convex end and the other with a concave seat therefor and forcing them together by any suitable form of clamping or compressing device, whereby the central and most salient part of the convex pipe end will be tightly seated in the concavity prepared for it in the other member or section of the pipe, forming a joint which internal pressure of liquid will tend to render more tight, as hereinafter explained.

Figure 200:
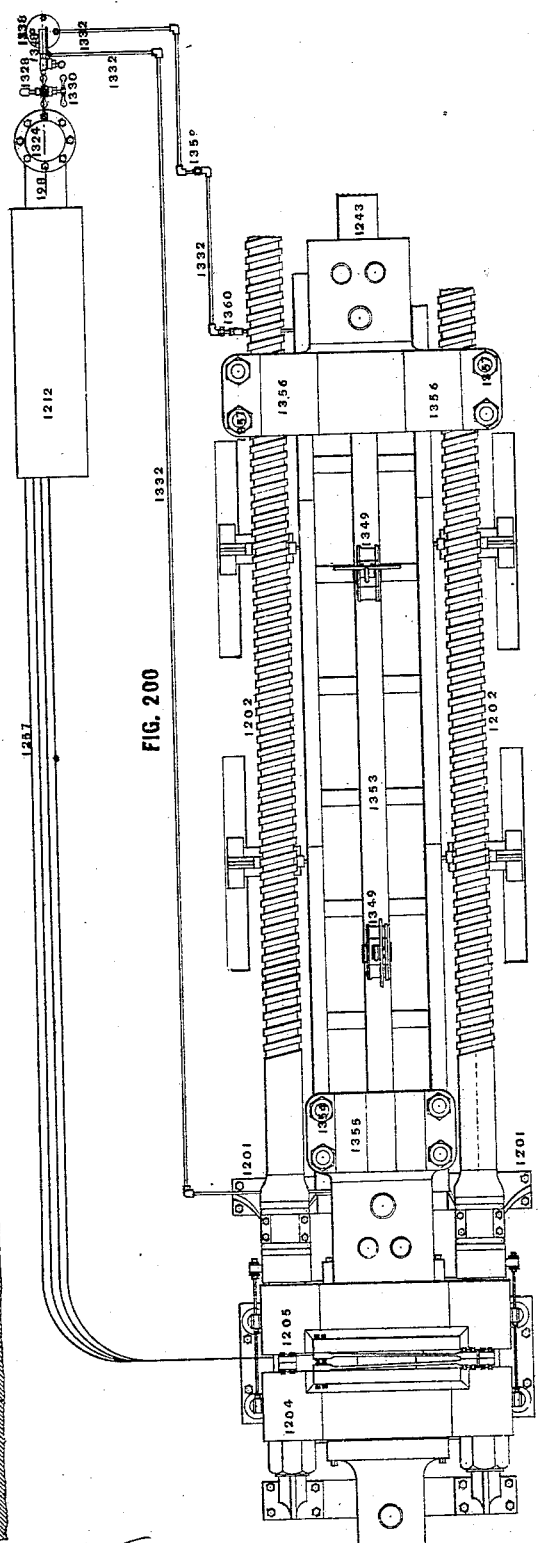

In the accompanying drawings the invention is represented in fifteen views, numbered 189 to 200, inclusive, and 198$^a$, 198$^b$, and 198$^c$. Figure 189 is a front view of a power-accumulator, consisting of a vertical series of weights and a guiding-frame. Fig. 190 is a side elevation. Fig. 191 is a vertical section on the line 191, Fig. 192. Fig. 192 is a plan. Figs. 193 and 194 are sectional elevations of flexible pipe-joints. Fig. 195 is a plan of the joint shown in Fig. 194. Fig. 196 is an elevation of the base thereof, illustrating a slight modification. Fig. 197 is a longitudinal section on the line 197, Fig. 196. Fig. 198 is a sectional elevation, on a larger scale, of a pressure-multiplier and a pressure-reducer connected with liquid-pipes and couplings and valves. The line 198, Fig. 200, indicates the plane of section. Fig. 198$^a$ is a vertical section of the connecting-pipes in a plane at right angles to that in Fig. 198. Fig. 198$^b$ is a section of a portion of the same, on a larger scale, illustrating my improved pipe joint or coupling, and showing the parts before they are tightened. Fig. 198$^c$ is a similar view, showing the parts tightly screwed together. Fig. 199 is a front view of a portion of a testing-machine to which the invention may be applied. Fig. 200 is a plan of the same.

1301 is a vertical frame-work to receive and guide a series of weights, 1302 1303 1304 1305, mounted upon base-beams 1306, which are supported, when at rest, on the transverse beams 1307 of the stationary frame.

1308 represents a standard resting on a hollow hydraulic ram, 1309.

1310 represents a second hollow ram concentric with the first, and constituting the cylinder in which the said ram 1309 works.

1311 is the cylinder of the hollow ram 1310.

1312 is a jointed pipe conveying liquid to and from the inner ram, 1309.

1313 is a liquid-pipe communicating with the outer cylinder, 1311.

1314 are keys passed transversely through apertures 1315, prepared therefor in the standard 1308, and engaging beneath the base-beams 1306 of the weights, so as to raise any number of the said weights, determined by the number of keys which may be applied for the purpose.

Swiveled or jointed pipes are provided for conducting pressure-liquid from a hydraulic press or power-accumulator to the holding or straining press of a testing-machine, or any object in which it is desired to apply the pressure, and which is required to be movable to a limited extent relatively to the source of pressure. A simple jointed coupling may be employed, such as is illustrated in Fig. 193; or coupling illustrated in Figs. 194, 195, 196 is employed. This latter consists, in part, of an angular clamp, 1316, secured to a base-plate, 1317, by screws 1318. The base of the clamp is constructed with a nipple, 1319, fitting within an elbow, 1320, a packing, 1321, being interposed and tightly clamped by a flanged nut, 1322. The elbow 1320 is further formed with a centering-stud, 1323, (shown in dotted lines in Fig. 194,) and is forced down upon the nipple 1319 by the action of the two parts 1316 1317 of the clamp. The elbow 1320 and the clamp-base 1317 are each tapped for the reception of pipes 1312. The coupling-nozzle of the clamp-base 1317 may be horizontal, as shown in Fig. 194, or vertical, as shown in Figs. 196 and 197, as preferred.

1324 1325 in Fig. 198 represent two cylinders of unequal diameter, constructed with base-flanges, as shown, by which they are clamped together by means of screw-bolts 1326.

1327 represents a duplex piston adapted at its respective ends to fit the cylinders 1324 and 1325, the piston-head being packed in any suitable manner.

The pipe 1328, Figs. 199 and 200, communicates, at the will of the operator, through a valve, (not shown,) with the high-pressure pipe 1312 or the lower pressure pipe 1313 of an accumulator, Figs. 189, 190, and 191, or with a pump if no accumulator be used. Said pipe 1328 enters the transverse pipes 1329 of the multiplier under the control of a cock, 1330.

1331 and 1332 are pipes communicating, respectively, with the large cylinder 1324 and the small cylinder 1325, and themselves connected by the transverse pipes 1329 under control of the valves 1333 1334, the latter of which is shown in section in Fig. 198 to illustrate the construction of each. They will be seen to shut off the communication of the transverse pipes 1329 with the respective horizontal pipes 1331 1332, to which they are applied, without closing the said horizontal pipes themselves.

1335 represents a cock closing the extremity of the pipe 1331 and permitting the discharge of water to a cistern when required.

The operation of this device is as follows: If it be desired to communicate pressure to the hydraulic straining or holding press from a pump or accumulator without any increase beyond the pressure developed in the pipe 1312 or 1313, as the case may be, the valves 1330 and 1334 are opened, permitting the pressure to pass freely from the pipe 1328 to the pipe 1332, which conducts it to the straining or holding presses. The valve 1333 being closed to shut off communication between the transverse pipe 1329 and the large cylinder 1324, and the valve 1335 opened to communicate with the cistern, the pressure developed in the cylinder 1325 from the pipe 1332 will force the piston 1327 up, expelling the water from the large cylinder 1324 into the cistern. If, now, it be desired to develop an increased pressure, the valves 1335 and 1334 are closed and the valve 1333 opened. It will now be seen that the pressure cannot pass from the pipe 1328 to the pipe 1332, excepting through the multiplying-cylinders 1324 1325. The pressure entering the larger cylinder 1324 will force the piston down and develop pressure in the cylinder 1325 and conducting-pipe 1332 with an increase corresponding to the greater area of the large cylinder 1324 as compared with the cylinder 1325. The pipes 1332 communicate with hydraulic presses in the stationary and moving holders 1355 1356, (shown in Figs. 199 and 200.) The pipe or branch communicating with the weighing-holder 1355 has not flexible joints. That communicating with the straining-holder 1356 is provided with flexible joints at 1358 1359 1360.

In order to gage the pressure in the pipe 1332, a pressure-reducer is employed, consisting of a casing, which may be made in three parts, 1336 1337 1338, Fig. 198, tightly clamped together by screw-bolts 1339, and containing a liquid-pressure base, 1340, flexible diaphragm 1341, diaphragm-ring 1342, pressure-column 1343 1344, made in two parts, a centering and packing ring, 1345, and annular diaphragm. The base 1340 for the liquid-pressure chamber may be made separately, as here shown, or in one piece with the base 1336. The pressure-column may be made in one or in two pieces, as preferred. The centering and packing ring 1345 is made of rubber or other elastic material. It prevents contact of the column 1343 with the case 1337 or ring 1342, and permits the slight movement of the pressure-column without friction or sensible resistance. It also forms a packing to prevent any liquid which may ooze through the diaphragm 1341 from ascending within the case. Such liquid escapes through the aperture 1342ª.

1337ª is an aperture to place the air contained within the reducer in communication with the atmosphere. The small liquid-chamber between the base 1340 and diaphragm 1341 communicates with the pressure-pipe 1332. The larger liquid-chamber above the column 1344 and annular diaphragm 1346 communicates through a pipe, 1347, with a gage, 1348, Figs. 199 and 200, so as to act upon the said gage with reduced pressure.

1349 1349, Figs. 199 and 200, represent dynamometers, the details in construction of which are described in other applications of even date herewith. Said dynamometers are employed to sustain the weight of the specimen 1353 under compression, so that the test applied in a horizontal direction, as shown, may be approximately equivalent to the strain of compression applied to the specimen in the vertical position in which it is to be used. Any necessary number of these dynamometers are applied at proper distances apart. They are provided with adjusting-screw stirrups or nuts 1350, suspended by swiveled hooks 1351 from a beam or other support and working on screw-stems 1352. Before the strain is applied the dynamometers are so adjusted as to sustain the weight of the intermediate portion of the specimen to which they are applied to prevent its deflection by its own gravity. The strain being then applied, the attendant watches the indications of the dynamometers, and so adjusts them by means of the suspension-nuts 1350 as to keep the indications the same as before the strain was applied, so that the lateral force resulting from gravity of the material may not be used either to augment or reduce the proper deflecting effect in either direction of the strain of compression to which the specimen is subjected under test. If the indicator of the dynamometer shows that the downward pressure of the part of the specimen to which it is applied increases under the strain of compression, the hanger of the dynamometer must be lengthened until the initial indication is restored, so that the dynamometer will not resist the proper deflection of the specimen under strain. If, on the other hand, the indication of the dynamometer shows a reduction in vertical strain, indicating an inclination of the specimen to bend upward under the strain of compression, the dynamometer must be raised until the initial indication is restored, so that the weight of material in the specimen may not be used to resist its proper deflection under the strain of compression.

The holding or straining screws 1202 may be made each in a single piece, as illustrated in Figs. 199 and 200, or in separate pieces spliced or coupled, as described in connection with Figs. 166 and 167 in another application of even date herewith. The stanchions or stationary frame-work 1201 may be constructed as here shown, or as represented in the other application referred to, or in any suitable manner.

The holding-presses, straining-presses, and other essential parts and details of the machinery not described specifically in this application are described and some of them claimed in other applications of even date herewith.

The specimen-holder beams may be connected by tie-rods 1354 between the straining-screws 1202, as illustrated in the case of the weighing-holder beams 1355, Figs. 199 and 200, or they may be extended, as illustrated in the case of the straining-holder beams 1356 in same figures, and connected by tie-rods 1357 external to the straining-screws. The latter mode adapts the machine to receive a wider specimen.

The following parts may be essentially similar to parts indicated by corresponding reference-figures in another application of even date herewith: the coupled beams 1204 1205 and the device for holding and adjusting the same, the straining beam or press and the various devices for moving the same either for adjustment or for straining, also gages or weighing devices of any preferred kind connected with said straining-beam or with the weighbeams 1204 1205, as the case may be.

My improvement in pipe joints or couplings is shown in Figs. 198 and 198ª, and more clearly, on a larger scale, in Figs. 198ᵇ and 198ᶜ. 1332ª represents a concave seat, which I prefer to make in conical form; but it may be of hollow, spheroidal, or any other concave form. This concave seat is formed by boring in the end of one part or member of the desired pipe-joint. The other member is formed with a convex end, 1334ª. It may be, next the bore, of frusto-conical shape, of a more acute angle than the conical seat 1332ª which receives it, so that when the parts are pressed together a tight joint will be first formed next the bore of the pipe, the seal or tight closing together of the parts being extended outward from the bore in proportion to the pressure exerted in forcing them together. The conical surface of the end merges into a spheroidal surface; or the entire convex or projecting end of the pipe may be of spheroidal or other shape, which will adapt it to first engage at its extremity with the concave seat 1332ª next the bore, as described. The respective members of the joint or coupling may be formed with internal and external threads to adapt one to screw within the other, as shown at 1330ª, or they may be connected and compressed together by a coupling-sleeve, 1332ᶜ, flanged to confine one member of the joint, on which it turns, and threaded to receive the other member, on which it is screwed in the well-known manner represented in the drawings. My improved joint forms a tight seal around the bore of the pipe adapted to resist without leaking as great a pressure as the pipes it is employed to connect. It dispenses with the need of washers or gaskets, and affords security which is not attainable with any form of coupling in which it is attempted to produce a tight joint in the threads of the screw. It is free from liability to leak under excessive pressure, for the reason that the pressure developed within the pipe has a tendency to expand the extremity $1334^a$ of the pipe, where the walls are thinnest, more than the concave seat $1332^a$, where the whole thickness of the walls of the pipe resists such expansion. By screwing the parts of the coupling together with the necessary force, the metal is compressed, causing the tight joint between the pipe end $1334^a$ and the concave seat $1332^a$ to extend radially outward from the bore of the pipe to any required distance, and the greater the pressure within the pipe the further will be the radial extension of such tight joint. This joint having no packing, but being formed by the contact of metal surfaces, can be broken and remade as often as necessary without difficulty and without becoming impaired.

The following is here claimed as new:

1. An accumulator consisting of a hydraulic press and a number of weights so combined therewith that any desired number of the said weights may be connected with the press-ram, so as to be raised thereby at the will of the operator.

2. In a pressure-accumulator, the combination of a press-ram or piston, one or more weights, and a key or keys, enabling the separate coupling of said weight or weights to the piston, as and for the purposes set forth.

3. The combination of one or more weights, a piston-rod passing through the same, and a key or keys for connecting said piston-rod with the weight or weights for lifting the same, substantially as set forth.

4. The combination of a series of weights, a ram for lifting the same, and a rod separable from the ram, passing up through the weights, for lifting any or all of them by the action of the ram, substantially as described.

5. The combination of a series of weights, one or more rams for lifting them, and a frame for supporting the weights when at rest and guiding them when in motion or being lifted, as set forth.

6. An accumulator constructed with two or more rams, arranged for optional use in connection with the same weight or series of weights.

7. An accumulator constructed with two or more concentric rams, arranged for optional use on the same weight or series of weights.

8. The flexible pipe-joint, consisting of an elbow, 1320, nut 1322, packing 1321, clamp-stock 1316, clamp-arm 1317, and nipple 1319, with suitable connections, to operate substantially as set forth.

9. In combination with a holder or straining-press of a testing-machine, the hinged jointed pipe 1332, connecting said holder or straining-press with an accumulator or other source of pressure.

10. In combination with the pump or accumulator, and with the hydraulic holding or straining press or presses of a testing-machine, the coupled cylinders 1324 1325, of different areas, with connected pistons acted upon by the liquid from the pump or accumulator, and forcing liquid under increased pressure to the press or presses.

11. The conducting pipes and valves, combined with the differential cylinders and with a pump or accumulator and a hydraulic press or presses, substantially as herein set forth, to permit the application of pressure from the pump or accumulator, either directly or through the multiplier, at will.

12. The combination of a pressure chamber or pipe, a gage, and a reducer interposed between them to cause the indication of the applied pressure by a reduced pressure on the gage.

13. A gage-pressure reducer constructed separately from the gage, and consisting of a base, 1336, annular case 1337, cap 1338, pressure-column 1343 1344, and diaphragms 1341 1346, forming the two liquid-pressure chambers, substantially as set forth.

14. The combination of the base 1336 1340, diaphragm 1341, ring 1342, centering and packing ring 1345, and pressure-column, substantially as set forth.

15. A pipe-joint consisting of two members, one having a convex end or protuberance and the other a concave seat therefor, said members being screwed together, either directly or through the intervention of a coupling-piece, substantially as set forth.

16. The combination of the convex pipe end $1332^a$ and concave seat $1334^a$, having a greater angle or greater radius of curvature, causing the parts to engage first next the bore of the pipe and thence radially outward as the parts are screwed or pressed together.

ALBERT H. EMERY.

Witnesses:
OCTAVIUS KNIGHT,
WALTER ALLEN.